United States Patent Office 3,365,854
Patented Jan. 30, 1968

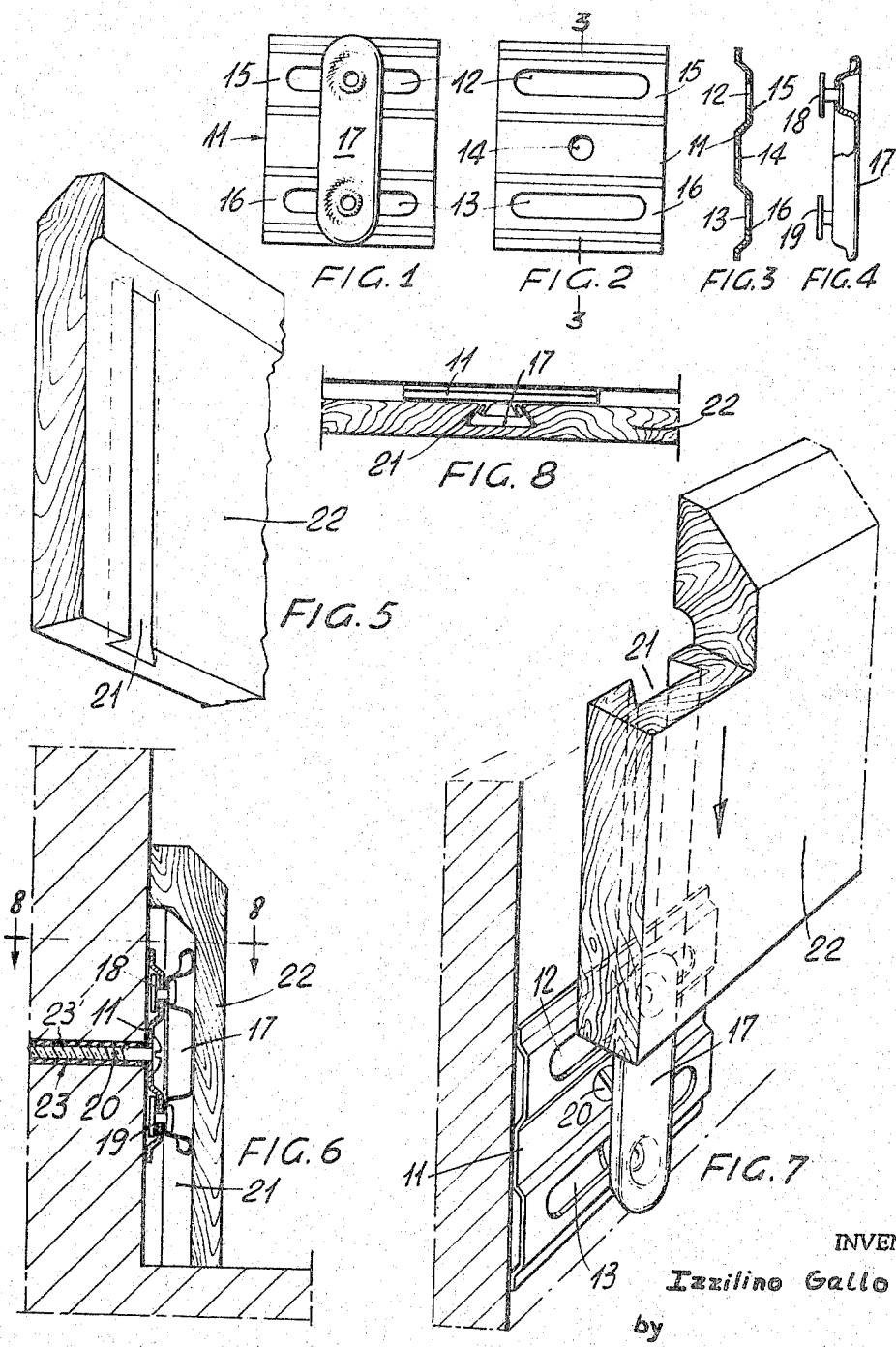

3,365,854
DEVICE FOR ANCHORING COVERING STRIPS OR PANELS, IN PARTICULAR SKIRTING BOARDS, TO A WALL
Izzilino Gallo, Piazza Insurrezione 10, Padova, Italy
Filed Nov. 3, 1965, Ser. No. 506,219
Claims priority, application Italy, Nov. 9, 1964, 24,117/64
5 Claims. (Cl. 52—716)

ABSTRACT OF THE DISCLOSURE

Anchoring device such as for anchoring a baseboard to a wall which includes an anchor plate for fixing to the wall and an engagement plate moveably retained on the anchor plate and formed to engage a dovetail groove in the baseboard.

---

The present invention relates to an anchoring device and is particularly concerned with an anchoring device for securing members to a wall.

In the building industry, many interconnections between parts are made, including the mounting of strips of trim molding or baseboards on the building walls. Much time is required for this work and the labor employed is expensive.

Further, since baseboards and trim moldings are usually fastened in place with screws or nails, removal thereof for any purpose is difficult and time consuming and often results in damage of the molding or baseboard.

The present invention proposes an anchoring or attaching device which permits rapid mounting of members on a wall, such members including baseboards, trim moldings, and the like.

The present invention is also concerned with an anchoring device of the nature referred to in which errors and inaccuracies in construction are compensated.

The nature of the present invention will be more clearly comprehended upon reference to the following detailed specification, taken together with the accompanying drawings, in which:

FIGURE 1 is a front view of the entire device.

FIGURE 2 shows the same device without the movable hook.

FIGURE 3 is a cross sectional view taken along line 3—3 of FIGURE 2.

FIGURE 4 is a side view of the separated movable hook.

FIGURE 5 shows the inner face of a portion of a baseboard with dovetail grooves adapted to engage in the movable hook.

FIGURE 6 is a vertical cross section of a wall portion to which the hooking device has been applied, with a baseboard mounted on the device.

FIGURE 7 is a perspective view of the device in the coupling step of the hook with the covering strip.

FIGURE 8 is a cross sectional view taken along line 8—8 of FIGURE 6, as seen from the front of the wall onto which the application is being effected.

The fastening device object of the present invention is essentially formed of a rectangular plate 11 provided with two transverse slits 12–13 and an axial central hole 14.

Said plate is so shaped as to form a pair of projections 15 and 16 making up a higher plane onto which spline or hook 17 bears, said spline or hook being provided with two fastening pins or buttons 18–19 that are introduced into the transverse slits 12–13, as shown in FIGURES 1, 2, 3 and 4.

The height of projections 15–16 above the bottom plane of the plate is such as to allow a space between said projections sufficient for receiving the head of the clamping screw 20.

The wedge-like section spline or hook 17 is to be introduced into equal section grooves 21 formed in the baseboard 22 or other panel or covering strip.

The purpose of slits 12–13 and increased length of grooves 21 with respect to length of spline or hook 17 is to allow for some movements being required owing to unavoidable inaccuracies of borings in the wall (seating for screw 20) or grooves 21 in panel 22. In fact, as shown by FIGURES 6 and 7, holes 23 of the wall are prearranged at predetermined distance and height. In said holes, the clamping screw 20 is screwed with the interposition of a common dowel 23' after having been inserted in hole 14 of the plate.

It will be apparent that the location of holes 23 can vary horizontally or vertically. Since movable hook or spline 17 can move horizontally within slits 12–13 and vertically within groove 21, it is thus evident that any inaccuracy is automatically compensated for during assembling.

With its particular features, said device can also be otherwise utilized in the building industry where some assembling rapidity and even compensations for inaccuracies of holes in walls are required: such as, application of beadings, aphonous or non-conducting panels, decorative linings or coverings, and the like.

The invention has, evidently, no limitation as to materials being used for the panels, as well as those for constructing the anchoring means of the present invention.

What is claimed is:

1. An anchoring device particularly suitable for anchoring members such as moldings to a wall and comprising; an anchor plate adapted for being fixed to a wall, spaced parallel slits in said plate, an engagement bar adjacent said plate and extending transversely to said slits, said bar being substantially trapezoidal in cross sectional shape with the smaller base of the trapezoid near the plate and the larger base thereof remote from the plate, and fastening means secured to said bar and projecting through said slits and having heads thereon on their outer ends to secure the bar to the plate while permitting the bar to slide on the plate in the direction of the length of said slits, the trapezoidal shape of said bar adapting it for engagement with a dovetail groove in the member to be mounted on the wall to which said plate is fixed.

2. An anchoring device according to claim 1 wherein said fastening means are in the form of pins passing loosely through said slits so as to permit tilting of said bar in a plane parallel to that of said plate to enable the bar to conform to a dovetail groove which does not extend in a direction exactly at right angle to the length of said slits.

3. An anchoring device according to claim 2 in which said bar is an embossed metal plate.

4. An anchoring device according to claim 2 which includes a member such as a baseboard having a dovetail groove therein for receiving said bar, said groove being larger than said bar.

5. An anchoring device according to claim 4 in which said member has a flange along at least one longitudinal edge extending toward the wall to which the anchor plate is fixed, said flange projecting from the member toward the wall such a distance that the distance from the outer surface of the flange to the bottom of said dovetail groove is greater than the thickness of said anchoring device measured from the wall outwardly.

References Cited

UNITED STATES PATENTS

| | | | |
|---|---|---|---|
| 258,837 | 5/1882 | Willson | 52—288 |
| 2,073,795 | 3/1937 | Haugaard | 52—512 |
| 2,346,264 | 4/1944 | Marshall | 52—287 |
| 2,793,407 | 5/1957 | Johnston | 5—300 |
| 2,796,158 | 6/1957 | Miles et al. | 52—288 |
| 3,161,926 | 12/1964 | Schaub | 52—287 |
| 3,228,160 | 1/1966 | O'Brien | 52—290 |
| 3,265,416 | 8/1966 | Downes | 52—242 |

FRANCIS K. ZUGEL, *Primary Examiner.*